United States Patent
McDonald et al.

(10) Patent No.: US 7,452,224 B1
(45) Date of Patent: Nov. 18, 2008

(54) CLOCKSPRING SENSOR WITH LOCKING CLIP AND CENTERING MECHANISM

(75) Inventors: Ken McDonald, Novi, MI (US); Ernest Roy Thompson, Janesville, WI (US)

(73) Assignee: Bourns, Inc., Riverside, CA (US)

( * ) Notice: Subject to any disclaimer, the term of this patent is extended or adjusted under 35 U.S.C. 154(b) by 0 days.

(21) Appl. No.: 11/888,980

(22) Filed: Aug. 4, 2007

Related U.S. Application Data

(60) Provisional application No. 60/958,740, filed on Jul. 6, 2007.

(51) Int. Cl.
*H01R 35/04* (2006.01)
(52) U.S. Cl. .................................... 439/164
(58) Field of Classification Search ................ 439/164, 439/15
See application file for complete search history.

(56) References Cited

U.S. PATENT DOCUMENTS

| | | | |
|---|---|---|---|
| 5,429,517 A | 7/1995 | Bolen | |
| 5,460,535 A | 10/1995 | Bolen | |
| 5,593,310 A * | 1/1997 | Kawamoto et al. | 439/164 |
| 6,042,405 A * | 3/2000 | Masuda et al. | 439/164 |
| 6,059,590 A | 5/2000 | Bolen et al. | |
| 6,368,127 B1 * | 4/2002 | Araki et al. | 439/164 |
| 6,390,838 B1 * | 5/2002 | Kawamura | 439/164 |
| 2001/0044229 A1 * | 11/2001 | Bunselmeier et al. | 439/164 |
| 2002/0025705 A1 * | 2/2002 | Araki et al. | 439/164 |

* cited by examiner

*Primary Examiner*—Gary F. Paumen
(74) *Attorney, Agent, or Firm*—Michael Best & Friedrich LLP

(57) ABSTRACT

A clockspring device that includes an outer housing with a circumferential wall that defines a chamber. The circumferential wall includes a vertically-oriented track. A rotor having a keyway is configured to fit at least partially within the outer housing. A coil of cable is positioned within the chamber and has a first end and a second end. The first end of the coil of cable is attached to the rotor and the second end of the coil of cable is attached to the outer housing. A clip having a first end, a second end, and a middle portion is configured to fit within the vertically-oriented track. The middle portion of the clip has two flexible tabs. Each flexible tab has a portion that extends away from the middle portion. The flexible tabs are compressed or bent in order to insert the clip in the track and slide it along the track and into an engaged position. When the clip is in the engaged position, the position of the rotor is fixed with respect to the outer housing. The clip may be moved to a disengaged position where it is still positioned partly within the track. When the clip is in the disengaged position, the rotor is free to move relative to the outer housing. The circumferential wall of the housing may also include one or more ribs and two spring clips to help center the clockspring device when it is installed in an assembly, such as a steering gear assembly.

28 Claims, 7 Drawing Sheets

CLOCKSPRING SENSOR WITH LOCKING CLIP AND CENTERING MECHANISM

RELATED APPLICATIONS

This application claims priority to provisional application no. 60/958,740 filed on Jul. 6, 2007.

BACKGROUND

The present invention relates to clockspring connectors. In particular, embodiments of the invention relate to a clockspring device that has a locking clip that prevents movement between a housing and a rotor of the clockspring device. Other embodiments relate to a clockspring device that has a centering mechanism.

Clockspring connectors are used to provide an electrical connection between two devices where one of the devices moves relative to the other (e.g., there is rotational movement between the devices relative to an axis). For example, in automobiles, clockspring connectors can be used to connect airbag electronics located in a steering wheel to electronics in the car body. The airbag electronics move with the steering wheel relative to the electronics in the car body.

In other instances, clockspring connectors are used to provide electrical connections between sensors and processing electronics. For example, it is possible for a clockspring device to be fitted with a sensor that is capable of detecting the rotational movement of a steering wheel column. Such information may be used to determine the direction of steering as well as the amount of torque being applied by a driver to the steering wheel. This information may be used in a variety of vehicle systems including power-assisted steering systems, navigation systems, and vehicle stability systems.

Known clockspring connectors include an outer housing, a rotor member, and a "clockspring," which is coil of flat cable. One end of the cable is connected to a plug or terminal on the rotor and the other end of the cable is connected to a plug or terminal on the outer housing. The terminal on the outer housing is connected via another wire or cable to electronics in the car body and the terminal on the rotor is connected to a sensor or other electronics on the rotor or the steering wheel. As the steering wheel rotates, the coil of flat cable (or clockspring) within the clockspring connector is wound and unwound and provides a wired connection between moving parts. In many instances, this type of connection is preferable to the use of brushes or wireless connections that are sometimes used to provide an electrical connection between moving parts.

SUMMARY

Most clockspring devices are manufactured at the site of a specialty manufacturer and then shipped to a vehicle manufacturer. Thus, there is a delay from the time the clockspring device is manufactured and the time it is installed in a vehicle. To ensure proper operation of the device it can be important that the absolute position of the outer housing and rotor is maintained during transportation from the location where the clockspring device is manufactured to the location where the device is installed in a vehicle. In most cases, it is also important that the clockspring device be installed with the rotor and outer housing located at a fixed position (or positional index) with respect to one another in a steering gear assembly. Such a position might be one where there is an equal amount of movement in two directions based on the winding and unwinding of the coil or cable in the clockspring device. A lock is often used to maintain the components of the clockspring device in a fixed position prior to installation.

In at least one known clockspring device, a grenade pin-style locking pin is used to lock the components of the clockspring device. A grenade pin-style locking pin is manually removed by an installer when the clockspring device is installed. While a clockspring device with such a pin is functional, the manual step of removing and disposing of the pin is not satisfactory. Thus, a clockspring device with a pin that does not need to be removed would be desirable.

Another aspect that can be important to the operation of a clockspring device is its position with respect to steering gear assemblies or similar assemblies into which the device is installed. When installed in steering columns, known clockspring devices use a centering ring positioned between the steering column and the clockspring device to maintain the position of the clockspring housing within the steering gear assembly. However, the clearance between the clockspring housing and the steering gear housing provided by a centering ring is often such that undesired motion and displacement occurs. Thus, a clockspring device with features that center the device in a steering assembly with appropriate clearance but in a manner that reduces or eliminates unwanted motion and displacement would also be desirable.

One embodiment of the invention provides an improved lock for a clockspring device that does not require manual removal and disposal. Sometimes such a lock is referred to as an "unlocking mechanism" because the lock is normally opened or unlocked at the time the clockspring device is installed. When this occurs, the components in the clockspring device are free to move with respect to one another.

A clockspring device according to one embodiment includes an outer housing defining a chamber and a circumferential wall. The circumferential wall includes a track, which may be vertically-oriented. A rotor having a keyway is configured to fit at least partially within the outer housing. A coil of cable is positioned within the chamber and has a first end and a second end. The first end of the coil of cable is attached to the rotor and the second end of the coil of cable is attached to the outer housing. A clip having a first end, a second end, and a middle portion positioned between the first and second ends is configured to fit within the vertically-oriented track. The middle portion of the clip has two flexible tabs. Each flexible tab has a portion that extends away from the middle portion. The second end of the clip has a key configured to fit in the keyway.

In one variation, each flexible tab includes a finger, the track includes two stops, and each finger on each tab is configured to fit within one of the stops of the track.

The clockspring device may also include additional features that help center it in a steering assembly. Thus, in another embodiment, the clockspring device also includes two spring clips formed as a part of the outer housing which protrude from the circumferential wall. Longitudinal ribs are positioned on the outer housing and provide contact points to counter the force of the spring clips and maintain the centered position of the clockspring housing within the steering gear housing.

Another embodiment of the invention provides a method of maintaining the position of a rotor of a clockspring device with respect to a housing of the clockspring device. The method includes positioning a vertically-oriented track on an outside wall of an outer housing; configuring a rotor to have a keyway and a reel; and winding a coil of cable around the reel of the rotor. The method also includes positioning the rotor at least partially within the outer housing; configuring a clip to have a first end with a button, a second end with a key, and a middle portion between the first end and the second end with two flexible tabs; and inserting the clip into the track such that the flexible tabs bend and the key is engaged with the keyway.

Still another embodiment of the invention provides a method of maintaining the position of a clockspring device with respect to a steering gear assembly. The method includes positioning two vertically-oriented ribs on the outside wall of the outer housing; configuring spring clips in the outer housing to provide an interference fit with the steering gear housing such that the ribs and the spring clips retain the clockspring device in a centered position with respect to the steering gear; and flexibly deforming the spring clips in order to install the clockspring device within the steering gear assembly.

Other aspects and embodiments of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
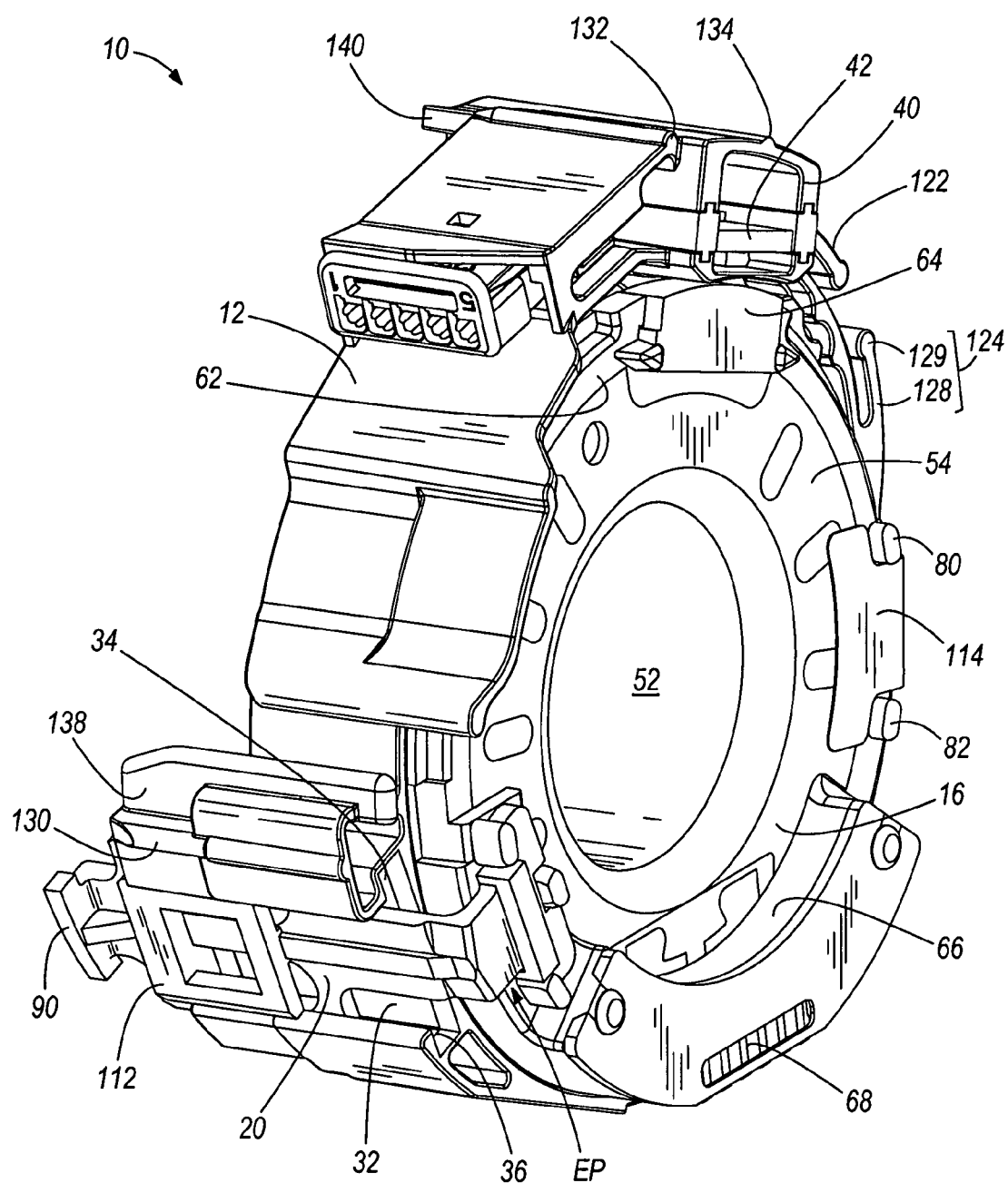
FIG. 1 is a prospective view of a clockspring device showing a locking clip in an engaged position.
Figure 2:
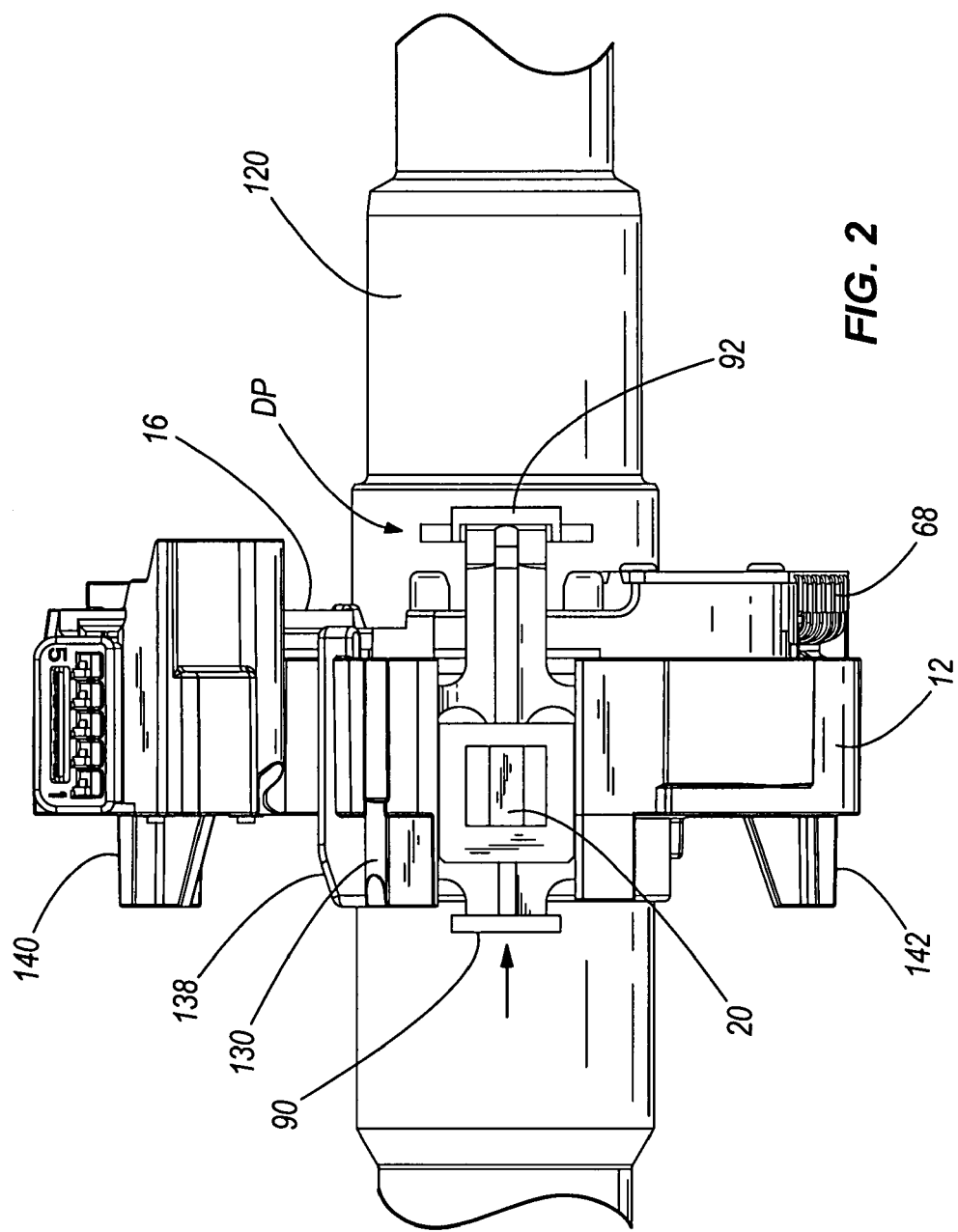
FIG. 2 is a side view of the clockspring device shown in FIG. 1 installed on a steering gear shaft with the locking clip in a disengaged position.
Figure 3:
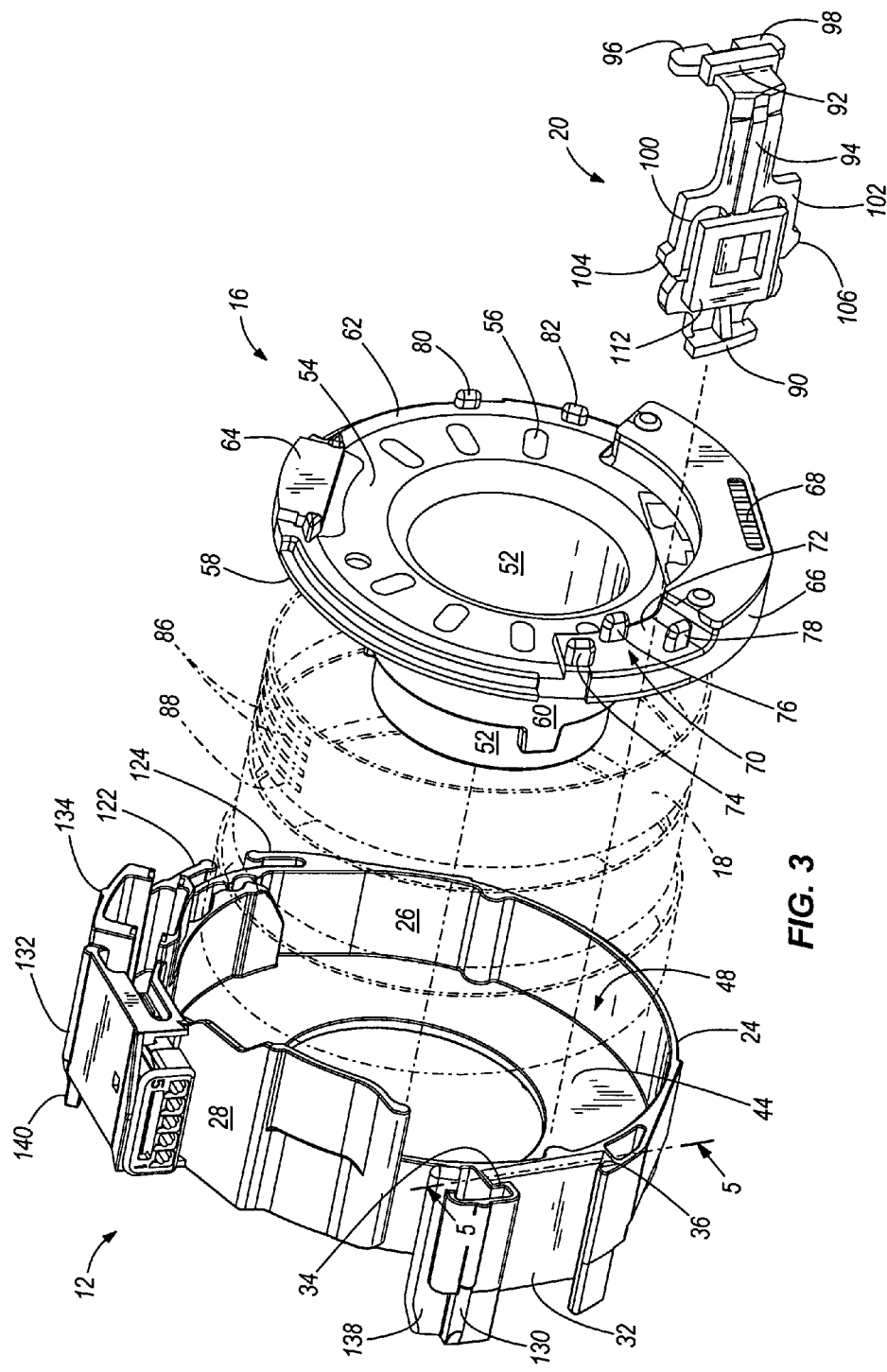
FIG. 3 is an exploded view of the clockspring device of FIG. 1.

A clockspring device 10 is illustrated in FIGS. 1, 2, and 3. As best seen by reference to FIG. 3, the clockspring device 10 includes four basic components: an outer housing 12, a rotor 16, a coiled cable 18 that is positioned around the rotor 16, and a locking clip 20.

The outer housing 12 can be made of non-conductive materials such as plastic and includes a circumferential wall 24 having an inner surface 26 and an outer surface 28. In the illustrated embodiment, the inner surface 26 is generally smooth and circular as shown in FIG. 3. The outer surface 28 is irregular and includes features that enable the outer housing 12 to remain in a fixed position with respect to other components of the clockspring device 10 when installed. The outer housing 12 also includes additional features that perform other functions.

In the illustrated embodiment, the outer surface 28 includes a vertically-oriented track 32. The track 32 is T-shaped in cross-section and includes two slots 34 and 36. The track 32 is configured to accept or hold the locking clip 20 that when engaged with a keyway (discussed below) of the rotor 16 helps maintain the rotor 16 and the outer housing 12 in a fixed position with respect to one another. The outer housing 12 also includes a terminal housing 40 to which a first end of the coiled cable 18 is connected. Sensors or sensor components, such as circuit 42, may be positioned in the terminal housing 40.

The outer housing 12 also includes a circular flange 44. The circular flange 44 and circumferential wall 24 at least partially define a cylindrical chamber 48. The chamber 48 is sized and configured to at least partially hold the rotor 16 and coiled cable 18.

As best seen by reference to FIGS. 1 and 3, the rotor 16 is made of metal and includes a reel 52 and a flange 54. The flange 54 includes a number of oval-shaped apertures 56 and a lip 58. A sleeve 60 is fit or molded over the reel 52 and a disc 62 is fit or molded on the flange 54. The sleeve 60 and disc 62 are made of non-conductive material such as plastic. In the embodiment illustrated, the disc 62 includes features for supporting or mounting a position sensor target 64. In one embodiment, the disc 62 includes a housing 66 for a torque sensor module and terminal assembly 68. The coiled cable 18 connects the torque sensor module and terminal assembly 68 to the terminal housing 40. A keyway 70 is formed on the disc 62 adjacent to the housing 66. The keyway 70 includes a surface 72 with three teeth 74, 76, and 78 that project outwardly from the surface 72. In the embodiment shown, the keyway 70 is parallel to the flange 54. The teeth 74, 76, and 78 are configured to interact with and be engaged by a key portion of the locking clip 20 (which is discussed below). The clockspring device 10 includes an additional, optional mechanism that secures the rotor 16 and outer housing 12. In the illustrated embodiment, two other teeth 80 and 82 project from the disc 62 and are configured to interact with and retain a piece of tear tape (also discussed below).

The coiled cable 18 is wound around the reel 52 and includes a first end connected to the terminal housing 40 and a second end connected to the torque sensor module and terminal assembly 68. The coiled cable 18 (shown in phantom lines in FIG. 3) includes multiple wires 86 that run parallel to each other within a long thin strip of an insulating material 88 (e.g., plastic). For the purpose of clarity, only a portion of the coiled cable 18 is shown with phantom lines illustrating the wires 86. When the coiled cable 18 is positioned within the clockspring device 10, it resembles a clockspring.

Figure 4:
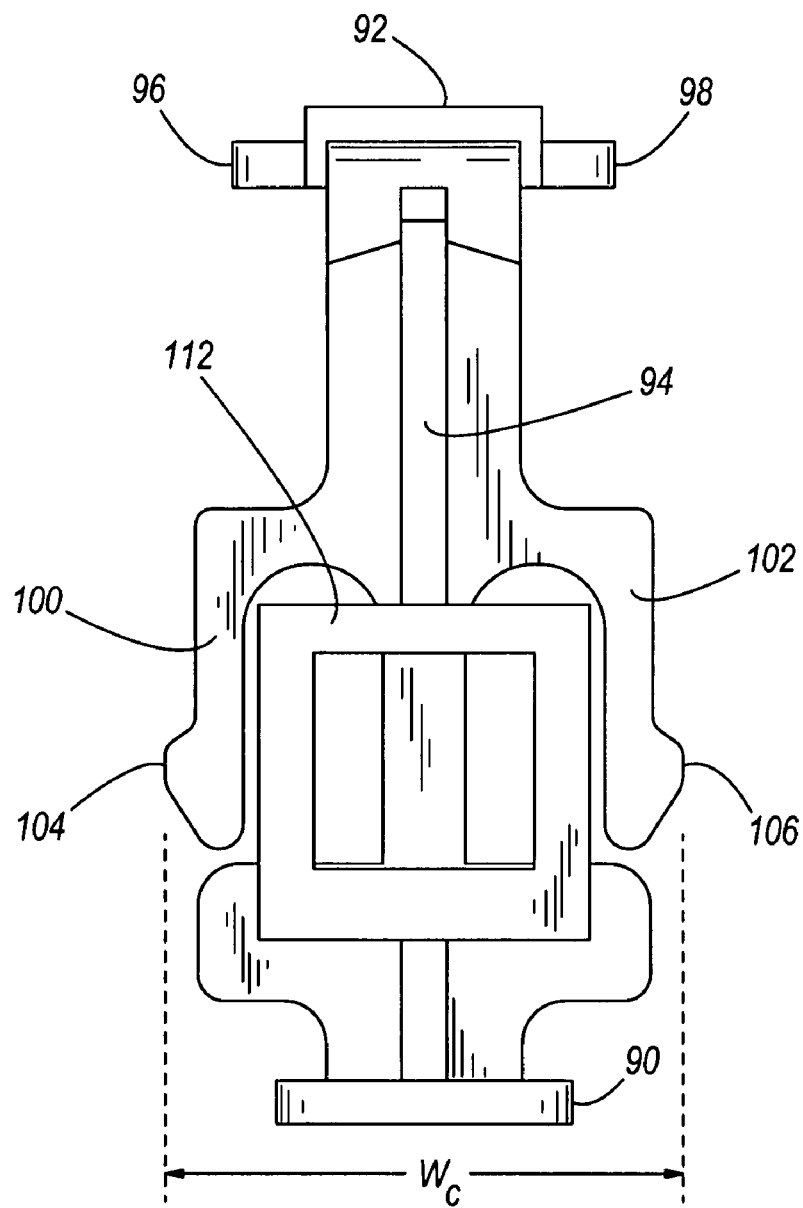
FIG. 4 is an enlarged frontal view of the locking clip of FIG. 1.

The locking clip 20 is best understood by reference to FIG. 4. The clip can be formed from non-conductive material such as that which is used to form the outer housing 12. The clip 20 includes a first end having a button 90. FIG. 1 shows the clip in an engaged position EP. The button 90 is used to push the clip 20 from the engaged position EP to a disengaged position DP (FIG. 2). In the disengaged position DP, the rotor 16 is free to rotate with respect to the outer housing 12. However, the clip still remains within the track 32. The clip 20 also includes a second end that has a key 92. The key 92 is configured to fit within the keyway 70 on the rotor 16 when the clip 20 is in the engaged position EP. The button 90 at the first end and the key 92 at the second end are connected by a longitudinal middle portion 94 that is configured to fit into and be moveable within the track 32.

As is best understood by reference to FIG. 3, the key 92 of the locking clip 20 projects at a right angle from the second end and includes two legs 96 and 98 that are configured to fit between the teeth 74, 76, and 78. When the clip 20 is engaged (i.e., in the locked or engaged position EP), the key 92 is in contact with the surface 72 of the keyway 70 and is positioned in a plane that is substantially perpendicular to the middle portion 94 of the clip 20. Leg 96 fits between teeth 74 and 76 and leg 98 fits between teeth 76 and 78.

The button 90 has a surface that projects at a right angle from the middle portion 94 and is configured to contact the steering gear housing when the clockspring device 10 is installed in a steering gear assembly (discussed in further detail below). On each side of the middle portion 94 of the clip 20 is an arm 100, 102. At the end of each arm 100, 102 is a finger 104, 106, respectively, which projects away from the middle portion 94. The distance from the outermost edge of one finger 104 to the outermost edge of the other 106, is the widest portion of the clip Wc. The arms 100, 102, and fingers 104, 106 of the clip are designed such that in a stable position, the widest portion of the clip Wc is slightly greater than the width of the track Wt. The middle portion 94 of the clip is also designed such that arms 100 and 102 can be resiliently flexed inward toward each other such that the width of the clip Wc is slightly less than the width of the track Wt. To insert the clip 20 into the track 32, arm 100 is compressed and finger 104 is interference fit within track slot 34. The other arm 102 is compressed and finger 106 is interference fit within the other track slot 36. The locking clip 20 is then pushed along the track 32 until it reaches the engaged position EP.

Figure 5:
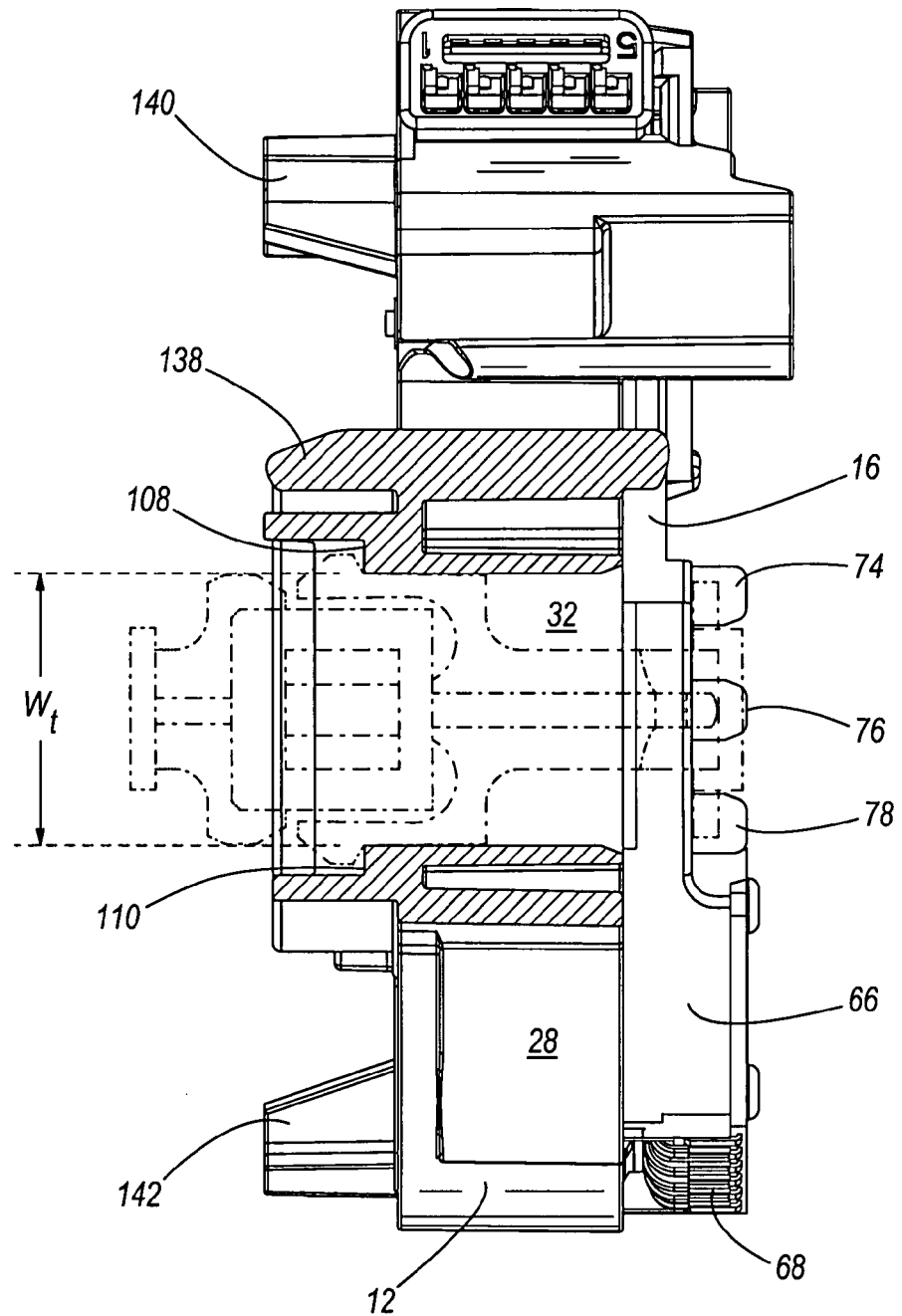
FIG. 5 is a cross-sectional side view of the clockspring device taken along line 5-5 of FIG. 3.

As shown in FIG. 5, the end of the track 32 includes two mechanical stops 108, 110 for the fingers 104, 106 when the clip 20 reaches the locked or engaged position EP. Specifically, the compressed arms 100, 102 within the track slots 32, 34 are uncompressed when the fingers 104, 106 are pushed beyond the end of the track 32. In the engaged position EP, the fingers 104 and 106 rest against stops 108 and 110, respectively. As a result, the clip 20 is prevented from reverse movement along the track 32 and the consequent disengagement of the key 92 from the keyway 70 except by a substantial force in the reverse direction (indicated by the arrow in FIG. 2). The middle portion 94 also includes a raised, rectangularly-shaped retainer 112 that further constrains the clip 20 to translational movement along the track 32.

The locking clip 20 is designed to be inserted and then retained in the track 32 on the outer housing 12 of the clockspring device 10 for transport and handling prior to installation of the clockspring device 10 within a gear assembly. When the clockspring device 10 has been assembled and the rotor 16 is in the proper orientation with respect to the outer housing 12, the arms 100 and 102 of the clip 20 are flexed inward and the clip 20 is slidably inserted into the track 32 (along the path indicated by the broken line in FIG. 3) until it reaches the engaged position EP. FIG. 1 shows the clip 20 in the engaged position with the key 92 securely positioned within the keyway 70 and the button 90 projecting from the track 32. A piece of tear tape 114 can also be affixed to the flange 54, between the teeth 80 and 82, and to the outer surface 28 of the outer housing 12 to further secure the rotor 16 to the housing 12 (as shown in FIG. 1). Due to the fit between the fingers 104, 106 of the clip and the stops 108, 110 at the end of the track, as well as the attachment created by taping the components with the tear tape 114, motion and vibration generally associated with shipping and handling has limited impact on the clip 20 and it remains in the engaged position EP as a consequence.

The locking clip 20 is forcibly disengaged when the clockspring device 10 is installed within a steering gear assembly. When the clockspring device 10 is positioned within an assembly, the button 90 makes physical contact with another component of the assembly. This forcible contact overcomes the interference fit of clip fingers 104 and 106 with track stops 108 and 110. As a result of this force, the clip arms 100, 102 are deflected inward such that the fingers 104, 106 fit into the track slots 34, 36. The clip 20 is then pushed along the track 32, which consequently moves the key 92 out of the keyway 70. In the disengaged position DP, the clip 20 no longer prevents rotational movement of the rotor 16 with respect to the outer housing 12. When sufficient rotation occurs, the tear tape 114 is ripped or torn. With the tape 114 torn and the clip 20 in the disengaged position DP, free movement of the rotor 16 and housing 12 can occur.

Figure 6:
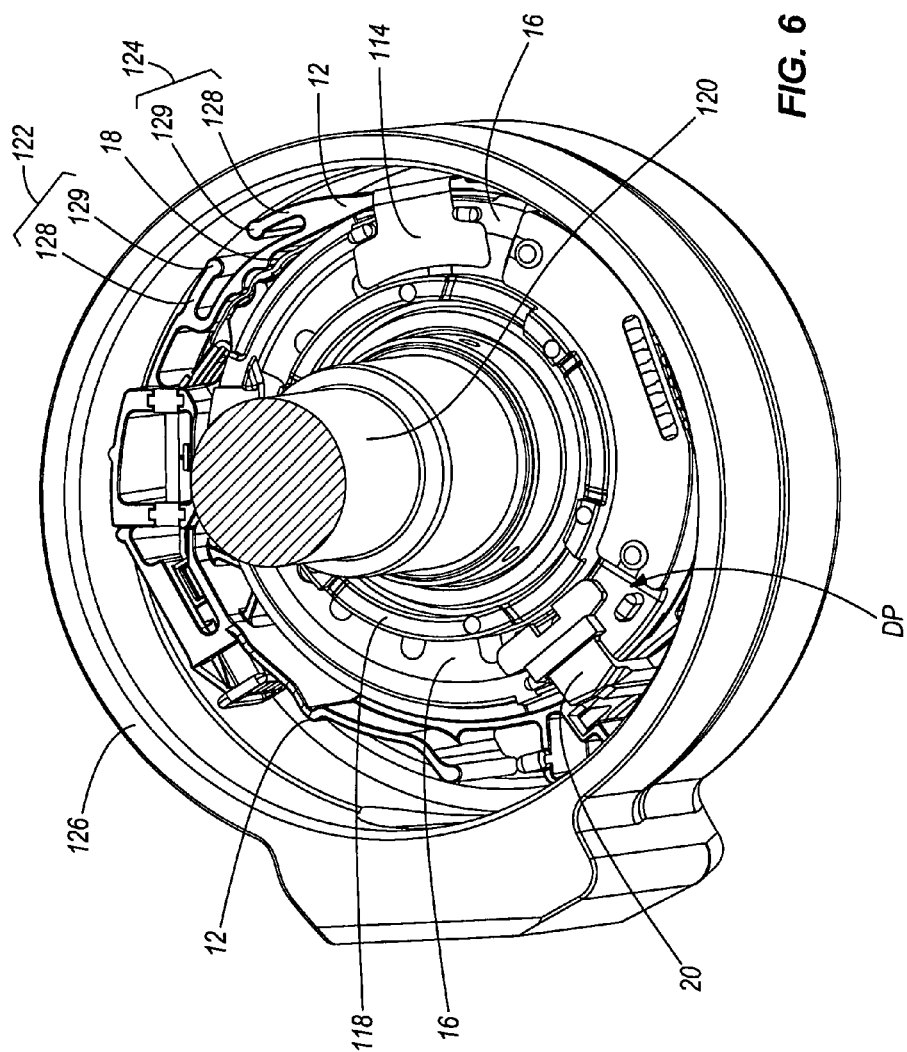
FIG. 6 is a perspective view of the clockspring device of FIG. 1 installed on a steering gear assembly.
Figure 7:
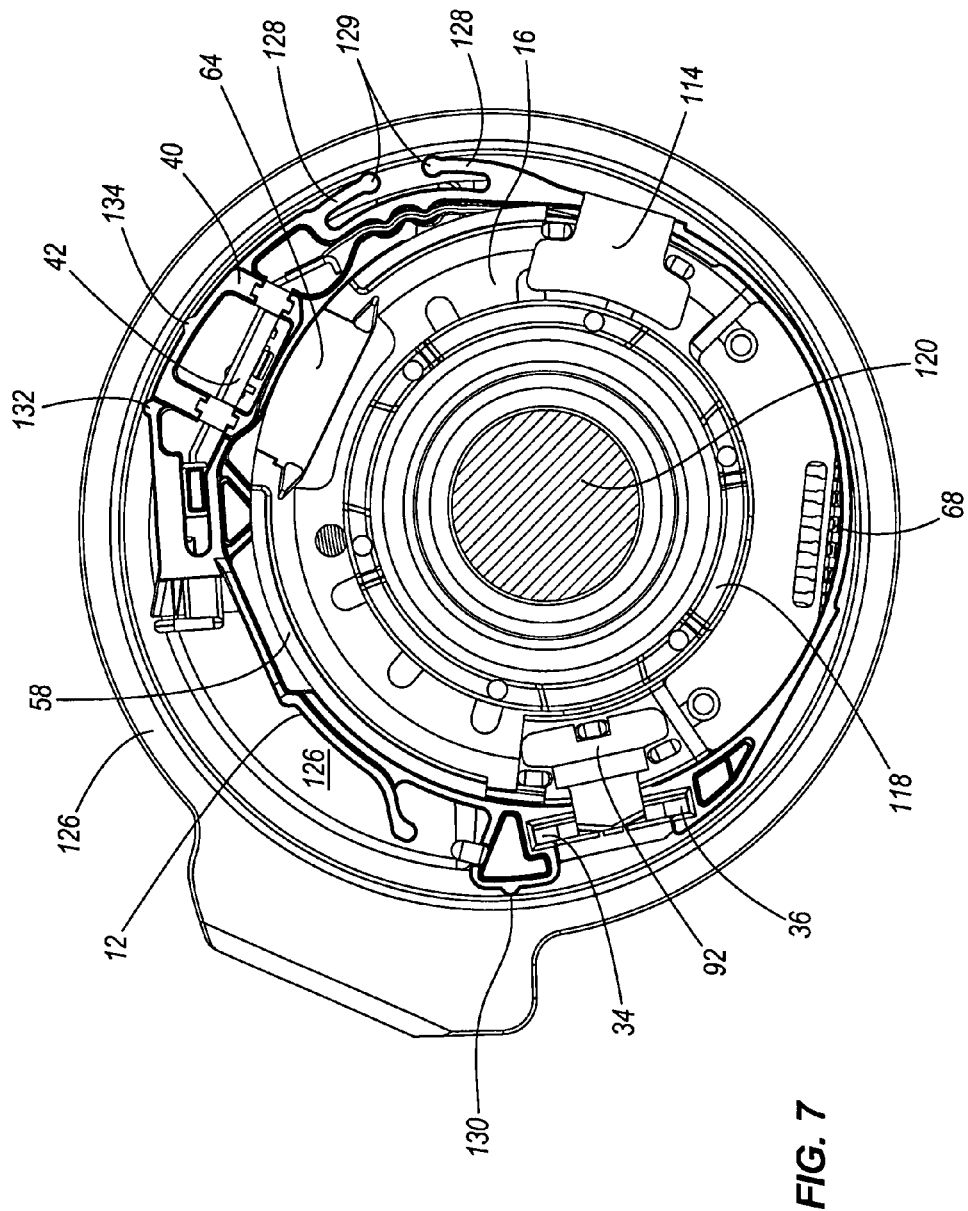
FIG. 7 is a top view of the clockspring device of FIG. 1 installed on a steering gear assembly.

Other features on the outer housing 12 of the clockspring device 10 aid in maintaining the centering of the device within the steering gear assembly. As is best understood by reference to FIGS. 6 and 7, a magnet 118 is used as a target for sensor 66. The magnet 118 is positioned around the outer circumference of a gear shaft 120, and the rotor 16 is positioned around the outer circumference of the magnet 118.

In one embodiment, the clockspring device 10 includes spring clips 122, 124 which maintain the fixed position of the outer housing 12 of the clockspring device within a gear housing 126. The spring clips 122, 124 are integrally formed with the outer housing 12 and extend from the outer surface 28 of the circumferential wall 24. In the embodiment shown, the spring clips 122 and 124 are symmetric and structurally similar. Each one includes a leaf 128 and a rod 129. When the clockspring device is installed in an assembly, the spring clips 122 and 124 are resiliently deflected toward the housing to provide a snug fit between the outer surface 28 of the outer housing 12 and the interior of the gear housing. FIG. 1 shows three vertical ribs 130, 132, and 134, which are also provided as features in the housing's outer surface 28. The rib 130 is located on a leg 138 near the track 32. The leg 138 protrudes from the general perimeter of the outer housing 12. As a consequence, the rib 130 protrudes from the general perimeter. The ribs 132 and 134 also protrude from the perimeter. The ribs 130, 132, and 134 serve as contact points that contact the gear housing 126. The force of the spring clips 122 and 124 pushes the ribs against the gear housing 126 such that a tight fit is provided to reduce play.

As shown most clearly in FIGS. 2 and 5, the outer housing 12 also includes three feet 138, 140, 142 which vertically offset the clockspring housing from the gear housing 126. Foot 138 extends from a portion of the track 32, foot 140 extends from the housing terminal 40, and foot 142 extends from the circular flange 44.

Thus, embodiments of the invention provide, among other things, a clockspring locking clip 20 that when engaged prevents movement of the outer housing 12 with respect to the rotor 16. The clip is disengaged automatically as the clockspring device 10 is installed in a gear or other assembly, thereby allowing the rotor 16 to rotate with respect to the outer housing 12. The clip 20 also remains connected to the clockspring device 10 and does not have to be completely removed or discarded.

Embodiments of the invention also provide a centering mechanism in the form of spring clips 122 and 124 and one or more of the ribs 130, 132, and 134.

Various features and advantages of the invention are set forth in the following claims.

What is claimed is:

1. A clockspring device comprising:
   an outer housing defining a chamber and a circumferential wall, the circumferential wall including a vertically-oriented track;
   a rotor having a keyway and configured to fit at least partially within the outer housing;
   a coil of cable positioned within the chamber and having a first end and a second end, the first end of the coil of cable attached to the rotor and the second end of the coil of cable attached to the outer housing; and a clip configured to fit in the vertically-oriented track and having a first end, a second end, and a middle portion positioned between the first and second ends, the middle portion having two flexible tabs, each flexible tab having a portion that extends away from the middle portion, the second end of the clip having a key configured to fit in the keyway.

2. A clockspring device as claimed in claim 1, wherein the rotor has a reel and a circular flange connected to or integral with the reel.

3. A clockspring device as claimed in claim 2, wherein the keyway is parallel to the flange and the key is positioned in a plane that is substantially perpendicular to the middle portion of the clip.

4. A clockspring device as claimed in claim 2, further comprising a sensor connected to or positioned on the flange.

5. A clockspring device as claimed in claim 1, wherein the keyway has at least three teeth.

6. A clockspring device as claimed in claim 5, wherein the key is configured to engage the at least three teeth.

7. A clockspring device as claimed in claim 1, wherein the first end of the clip has a button.

8. A clockspring device as claimed in claim 1, wherein the track includes a stop.

9. A clockspring device as claimed in claim 8, wherein each flexible tab includes a finger, the track includes two stops, and each finger on each tab is configured to fit within one stop of the track.

10. A clockspring device comprising:
   an outer housing including a circumferential wall having an inner surface and an outer surface and a track on the outer surface of the circumferential wall;
   a rotor having a keyway and a reel and configured to fit at least partially within the outer housing;
   a coil wound around the reel and having a first end and a second end, the first end of the coil attached to the rotor and the second end of the coil attached to the outer housing; and
   a clip configured to fit in the track and having a first end, a second end, and a middle portion positioned between the first and second ends, the middle portion having two flexible arms, each flexible arm having a portion that extends away from the middle portion, the second end of the clip having a key configured to fit in the keyway.

11. A clockspring device as claimed in claim 10, wherein the rotor has a circular flange connected to or integral with the reel.

12. A clockspring device as claimed in claim 11, wherein the keyway is parallel to the flange and the key is positioned in a plane that is substantially perpendicular to the middle portion of the clip.

13. A clockspring device as claimed in claim 11, further comprising a sensor connected to or positioned on the flange.

14. A clockspring device as claimed in claim 10, wherein the keyway has at least three teeth.

15. A clockspring device as claimed in claim 14, wherein the key is configured to engage the at least three teeth.

16. A clockspring device as claimed in claim 10, wherein the first end of the clip has a button.

17. A clockspring device as claimed in claim 10, wherein the track includes two stops.

18. A clockspring device as claimed in claim 17, wherein each flexible arm includes a finger, and each finger is configured to fit within one stop of the two stops.

19. A method of fixing the position of an outer housing and a rotor of a clockspring device, the method comprising:
   positioning a track on an outside wall of an outer housing;
   configuring a rotor to have a keyway and a reel;
   winding a coil of cable around the reel of the rotor;
   positioning the rotor at least partially within the outer housing;
   configuring a clip to have a first end with a button, a second end with a key, and a middle portion between the first end and the second end with two flexible tabs; and
   inserting the clip into the track such that the flexible tabs bend and the key is engaged with the keyway.

20. A method as claimed in claim 19, further comprising: disengaging the key from the keyway by pushing down on the button.

21. A method as claimed in claim 19, further comprising: taping the outer housing and rotor to one another.

22. A method as claimed in claim 19, further comprising: configuring the keyway with a plurality of teeth.

23. A method as claimed in claim 19, further comprising: orienting the key substantially perpendicular to the middle portion of the clip.

24. A clockspring device comprising:
   an outer housing including a circumferential wall having an inner surface and an outer surface, the circumferential wall including a track, one or more ribs that protrude from the outer surface of the circumferential wall, and first and second spring clips;
   a rotor having a keyway and a reel and configured to fit at least partially within the outer housing;
   a coil wound around the reel and having a first end and a second end, the first end of the coil attached to the rotor and the second end of the coil attached to the outer housing; and
   a clip configured to fit in the track and having a first end, a second end, and a middle portion positioned between the first and second ends, the middle portion having two flexible arms, each flexible arm having a portion that extends away from the middle portion, the second end of the clip having a key configured to fit in the keyway.

25. A clockspring device as claimed in claim 24, wherein the circumferential wall includes a leg and at least one of the one or more ribs is located on the leg.

26. A clockspring device as claimed in claim 24, wherein each of the first and second spring clips includes a leaf and a rod.

27. A clockspring device as claimed in claim 24, wherein the first and second spring clips are symmetrical to one another.

28. A clockspring device as claimed in claim 24, further comprising a plurality of feet extending from the outer housing.

* * * * *